Figures 1, 2:
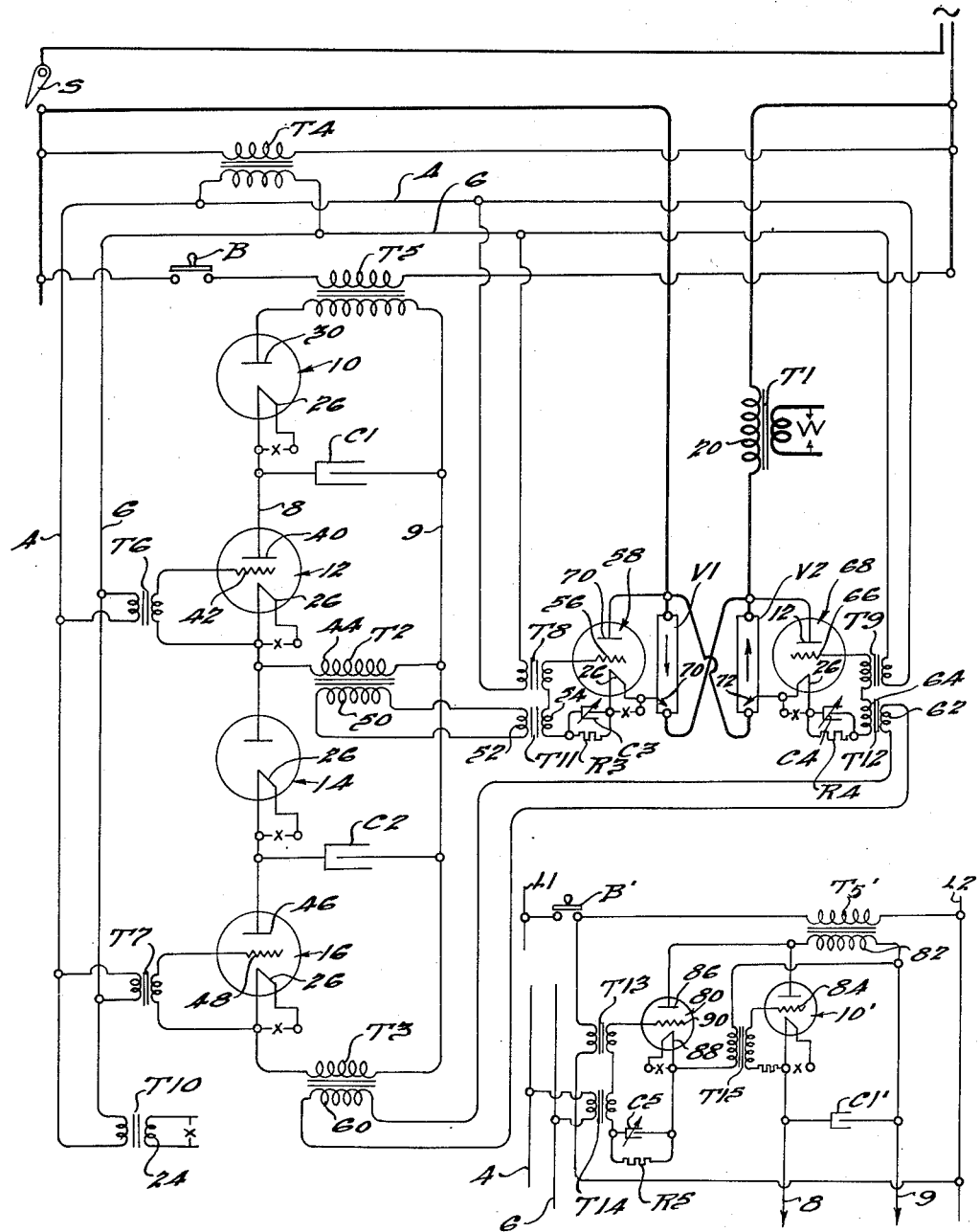

July 7, 1942.   C. J. COLLOM   2,289,321
TIMING CONTROL
Filed March 23, 1940

INVENTOR
Cletus J. Collom.
BY Harness, Dickey & Pierce
ATTORNEYS.

Patented July 7, 1942

2,289,321

UNITED STATES PATENT OFFICE 2,289,321

TIMING CONTROL

Cletus J. Collom, Detroit, Mich., assignor to Weltronic Corporation, Detroit, Mich., a corporation of Michigan Application March 23, 1940, Serial No. 325,553

19 Claims. (Cl. 250—27)

The present invention relates to systems for electrically controlling the timing of various operations, and particularly to such systems in which the operations are caused to occur in a definite time relation to a varying electrical characteristic of an associated circuit.

It will be appreciated from a complete understanding thereof that the improvements of the present invention may, in the broader aspects thereof, be embodied in various different forms, and may be applied to a relatively wide variety of purposes. A preferred application of the present invention is in connection with the automatic timing of the flow of welding current in electric welding systems, and when so applied, the present invention causes the flow of the welding current to be initiated and interrupted at substantially the zero point of the current wave in the welding supply circuit, and causes the welding current to flow for a timed interval composed of a variable but exact number of cycles of the welding current.

Various systems have heretofore been proposed for operation in accordance with the above general description, but the present system is regarded as a distinct improvement over such prior systems both in respect to the reliability of its operation, and in respect to the simplicity of the system.

With the above as well as other considerations in view, the principal objects of the present invention are to provide a system of the above generally indicated type, which is reliable in operation, simple in arrangement, and which dispenses entirely with contactors or switches having moving parts; to provide such a system characterized as employing translating means, which directly control the operating time, and which translating means is arranged to be actuated only at substantially the instant of reversal of current flow in the associated circuit; to provide such a system in which the translating means receives power during all or a predetermined part of a half-cycle of the current wave; to provide such a system employing a pair of related alternately actuated translating devices, one of which is actuated at the beginning of one-half cycle of the associated circuit, and the other whereof is actuated at the beginning of the next succeeding half-cycle of such circuit; to provide such a system embodying a plurality of interconnected electronic valves and energy storing devices arranged to effect the alternate actuation of the just mentioned translating devices; and to provide such a system employing control elements responsive to the translating devices so as to supply current to an associated work circuit in increments equal to an exact but adjustable number of full cycles of the supply circuit.

With the above as well as other objects in view, which appear in the following description and in the appended claims, a preferred but illustrative embodiment of the invention is shown in the accompanying drawing, in which Fig. 1 is a diagrammatic representation of circuits and associated elements embodying the invention, and Fig. 2 is a diagrammatic representation of a modification of the invention.

In Fig. 1, the timing mechanism is arranged to control the supply of power to an illustrative work circuit, designated W, and which work circuit may, as previously mentioned, and preferably does represent a welding circuit.

The primary winding 20 of the illustrative work transformer T1 is supplied with alternating current, of a frequency, for example, of 60 cycles, through the supply conductors L1 and L2, and through a pair of reversely connected electronic valves V1 and V2. The valves V1 and V2 may be variously constructed, but are preferably of the type known commercially under the trade name "Ignitrons", which valves are characterized in that, upon being ignited, they will transmit current in one direction, but will not transmit such current in the other direction. As described below, the valve V1 is ignited at the beginning of each negative half-cycle of current flow in the work circuit, and, when so ignited valve V1 is effective to transmit current throughout such negative one-half cycle and interrupt the current flow at the conclusion thereof. The arrangement is further such, as described below, that the valve V2 is ignited at the beginning of the next successive or positive one-half cycle of current flow and so transmits current throughout such positive half-cycle.

In accordance with the present invention, the igniting of the valves V1 and V2 is controlled, respectively, by translating devices T2 and T3, herein illustrated as transformers, which devices are controlled by a plurality of electronic valves designated 10, 12, 14, and 16, and timing condensers C1 and C2, the relation being such that translating device T2 is actuated at the beginning of each negative one-half cycle and the translating device T3 is actuated at the beginning of each positive half-cycle. The starting and stopping of the system is controlled by an operator B, which may, in the broader aspects of the invention, be automatically controlled, but which is illustrated in Fig. 1 as a manually operable push button. It is thought that the remaining details of the system may best be understood with reference to a description of operation thereof.

Assuming it is desired to condition the system for operation, the main control switch S may be closed, thus connecting the primary winding 20 of the work transformer T1 to the supply circuit L1—L2 through the valves V1 and V2. This action does not, however, initiate an immediate flow of current to the work circuit, since the valves V1 and V2 have not been ignited, and consequently, are in a non-conducting condition. Closure of the switch S also supplies power to the primary winding 22 of the control transformer T4, which accordingly energizes the control transformers T6, T7, T8, and T9, and the heater transformer T10 through lines 4 and 6. The secondary winding 24 of the heater transformer T10, is, as is indicated by the reference character X, continuously effective, so long as the switch S is closed, to supply heating current to the filaments 26 of the electronic valves 10, 12, 14 and 16, and the igniter valves 58 and 68.

The electronic valve 10 is of conventional two element type, having in addition to the filament 26, a conventional plate 30 and it will be understood that this valve is effective to transmit current so long as the plate 30 is positive relative to the filament 26 and so long as the potential from plate to filament is equal to or in excess of a predetermined value. The electronic valve 14 is similar to valve 10, and valves 12, 16, 58, and 68 differ therefrom only in that they are provided with usual control grids.

Assuming it is desired to apply power to the work circuit W, the push button B may be closed, which action immediately energizes the control transformer T5, which thereupon applies a potential across the valve 10. If the push button B is closed at any time during that half-cycle of current flow in the secondary circuit of transformer T5 during which the plate 30 is negative, it will be understood that such action does not render the valve 10 conducting, since the valve 10 will not pass current during such half-cycle. If the closure of the push button B occurs during the half-cycle of the current flow during which plate 30 is positive (hereinafter referred to as the positive half-cycle) such closure renders the transformer T5 effective to pass current through the circuit including the secondary 32 of the control transformer T5, the valve 10, and thence through the timing condenser C1. The flow of current in the just mentioned charging circuit, builds up a charge in the condenser C1 and the relation is preferably such that the charge on condenser C1 builds up to what is referred to hereinafter as the critical value during a very small fraction of the full positive half-cycle, so that condenser C1 may be regarded as reaching its critical charge substantially immediately upon the closure of button B.

During the just mentioned positive half-cycle of current flow, the plate 40 of valve 12 is positive relative to the filament 26 thereof, but the connections for control transformer T6 associated with valve 12 are such that a blocking potential is applied to the grid 42, thus rendering valve 12 non-conducting.

At the conclusion of the just-mentioned first positive half-cycle of current flow following the closure of starting button B, the polarity of transformer T5 is reversed, thereby rendering the plate 30 of valve 10 negative relative to the filament 26 thereof and interrupting the flow of current through the above traced charging circuit. At this time, however, the timing condenser C1 renders the plate 40 of valve 12 positive relative to the filament 26 thereof, and the reversal in polarity of transformer T4 and consequently of transformer T6, brings the potential grid 42 to a value at which valve 12 is conducting. Consequently, at the instant of reversal of polarity of the circuit, and assuming the charge on condenser C1 has reached the critical value, condenser C1 is rendered effective to cause a flow of current through the valve 12 and through the primary of the transformer T2. A part of the discharge current from condenser C1 also passes through the valve 14, which is now in a conducting condition, and thence through the second timing condenser C2.

The impulse of current through the transformer T2 ignites the valve V1, as described below, thus connecting the work transformer T1 to the source of power and initiating a flow of current in the work circuit W. At the same time, the current supplied from condenser C1 to condenser C2 brings the charge on the latter to a value above the critical operating voltage for valve 16, thus conditioning condenser C2 to cause a flow of current through this valve at the beginning of the second positive half cycle of current flow.

At the beginning of the second positive one-half cycle of current flow, the polarity of transformer T7 reverses, and applies a potential to the grid 48 of the valve 16 such as to render the valve 16 conducting, at which time the condenser C2 is enabled to discharge through the valve 16 and energize the transformer T3. The current from condenser C2 is blocked by the valve 14, however, thus preventing a reenergization of transformer T2 from condenser C2. The energization of transformer T2 ignites valve V2, as described below, so that the work transformer is now supplied through valve V2, valve V1 being non-conducting during the positive half cycle, as will be understood.

At the beginning of the second positive half-cycle of current, also, the polarity of the plate 30 of valve 10 again becomes positive relative to the filament 26 thereof, and assuming the push button B is still closed, valve 10 again becomes conducting, thus enabling transformer T5 to charge up condenser C1 during such second positive half-cycle. At the conclusion of the second positive half-cycle, valve 10 again becomes non-conducting and because of the reversal of potential on transformer T6, valve 12 becomes conducting. This action enables condenser C1 to discharge through valve 12 and energize transformer T2, which thereupon ignites valve V1. This action also enables condenser C1 to discharge through valve 14 and charge up condenser C2. At the conclusion of the second negative half-cycle, again, the reversal in polarity of transformer T7 renders valve 16 conducting, enabling condenser C2 to discharge therethrough and energize transformer T3, which ignites valve V2. Also, the recharging of condenser C1 is initiated through valve 10.

It will be observed, therefore, that so long as push button B is held closed, condenser C1 is charged during each positive half-cycle of current flow and condenser C2 is charged during each negative half-cycle of current flow. Also, at the beginning of each negative cycle of current flow, transformer T2 is energized through condenser C1, and at the beginning of each positive half-cycle of current flow, transformer T3 is energized by means of the energy stored in condenser C2. Transformer T2 is, therefore, energized at the beginning of each successive negative half-cycle of current flow, and transformer T3 is energized at the beginning of each successive positive half-cycle of current flow.

In the present instance, the energization of the translating devices T2 and T3 is utilized to successively fire the oppositely connected valves V1 and V2. More specifically, the secondary winding 50 of the transformer T2 is electrically connected to the primary winding 52 of an additional control transformer T11, the secondary winding 54 whereof is connected to the grid 56 of valve 58, which is employed to fire or ignite the valve V1. Also, the secondary winding 60 of the transformer T3 is electrically connected to the primary winding 62 of a control transformer T12, the secondary winding 64 whereof is connected in the circuit of the grid 66 on the valve 68, employed to fire or ignite the valve. The transformers T8 and T11, associated with the grid 66 of valve 58, are connected in opposition to each other, the relation being such that so long as transformer T11 is unenergized, transformer T8 applies such a potential to the grid 66 as to render the valve 58 non-conducting. When transformer T11 is energized, however, the potential of grid 66 assumes a value at which valve 58 is conducting. This action occurs at a time when the plate 70 of valve 58 is positive relative to the filament 26. The plate circuits of the valves 58 and 68, respectively, are conventionally connected across the anodes and igniters 70 and 72 of the valves V1 and V2.

Upon being rendered conducting, the valve 58 fires the valve V1 in a well known manner, that is to say, it renders the latter conducting, and, since the construction and arrangement of the valve V1 is such that upon being initially ignited, it remains conducting throughout the balance of the corresponding, or, in this case, negative, half-cycle, of current flow therethrough, it will be understood that the energization of transformer T2 need be only of a momentary character. It will be understood, however, that by proper design of the associated circuits, the current flow through transformers T2 and T3 may be caused to persist during all or any desired part of the corresponding half-cycle.

Similarly, transformers T9 and T12 are connected in opposition to each other and except when transformer T3 is energized, transformer T9 applies a blocking potential to the grid 66 of the valve 68. As soon as transformer T3 is energized, however, transformers T9 and T12 so far neutralize each other as to bring grid 66 to a potential at which the valve 68 is conducting, which action occurs at a time when the plate 72 thereof is positive relative to its filament 26. Under the conditions stated, accordingly, valve 68 fires valve V2 which thereupon remains conducting for the balance of the positive half-cycle of current flow therethrough. It will be noted that valves V1 and V2 are connected oppositely to each other so that the work transformer T1 receives current so long as either valve V1 or valve V2 is conducting. Thus, so long as push button B is held closed, valve V1 conducts during each negative half-cycle of current flow and valve V2 conducts during each positive half-cycle of current flow, thus rendering the transformer T1 continuously energized.

Assuming it is desired to interrupt the supply of power to the work circuit W, the push button B may be released to the open position, which action disconnects transformer T5 from the source of power. It will be recalled that transformer T5 serves only to supply charging current to condenser C1, and is effective for this purpose only during the positive half-cycle of current flow. Accordingly, if the opening of button B occurs during the negative half-cycle of current flow, such opening has no immediate effect on the system. Instead, having been fully charged at the conclusion of the preceding positive half-cycle of current flow, condenser C1 became effective, at the beginning of the negative half-cycle in question, to discharge through transformer T2, energizing the same and firing valve V1, and also remains effective during such negative half-cycle, to charge condenser C2. At the conclusion of the negative half-cycle in question, the open position of push button B prevents a recharging of condenser C1, but condenser C2, nevertheless, is effective to discharge through transformer T3 and fire valve V2. Assuming the button is opened during the negative half-cycle, therefore, the system remains effective to complete the full cycle of current flow through to the work circuit W, which was initiated at the beginning of the negative half-cycle in question, and work transformer T1 is de-energized at the end of the positive half-cycle of current flow following such opening of button B.

Assuming that the opening of the push button B occurs during a positive half-cycle, such opening, by de-energizing transformer T5, interrupts the charging of the condenser C1. Since condenser C1 receives its full charge in a very small fraction of a full half-cycle, it will be appreciated that unless this opening action occurs substantially at the beginning of the positive half-cycle, it may be assumed that, prior to such opening, the charge on condenser C1 will have reached a critical value at which it is effective to pass current through valve 12. In this event the action is the same as though push button B had been maintained closed until at least the beginning of the next negative half-cycle. Stated in another way, if the opening of push button B occurs during a positive half-cycle, but at such a point in such half-cycle that condenser C1 has received its critical charge, transformers T2 and T3 will be each energized once after such opening, thereby continuing the system in operation for one full cycle following the opening of push button B.

If, on the other hand, the opening of the push button occurs at such an early stage of a positive half-cycle that the charge on condenser C1 has not reached its critical value, such opening action will result in stopping the operation of the system at the conclusion of the positive half-cycle in question. This is for the reason, that during the positive half-cycle, valve V2 is conducting, so that the opening of push button B under the conditions now being assumed does not interfere with the operation of valve V2. By being opened prior to the time the condenser C1 reaches its critical charge, however, condenser C1 is rendered ineffective to cause a discharge through the valve 12 at the beginning of the next negative half-cycle.

Since condenser C1 receives its full or critical charge in an exceedingly small fraction of a full half-cycle, it may be assumed, for all practical purposes, that the closure of starting button B in starting the system occurs at a sufficiently early stage of a positive half-cycle to enable the charge on condenser C1 to reach a critical value before the close of such positive half-cycle. If it be assumed that the closure of push button B occurs too late to enable the critical charge on condenser C1 to be reached before the close of the positive half-cycle, it will be understood that condenser C1 is ineffective to pass current through valve 12 at the beginning of the negative half-cycle. Instead, the system remains inactive throughout the next negative half-cycle, during which valve 10 is non-conducting, and also throughout the next positive half-cycle, during which the charging up of condenser C1 is completed. Thus, the operation of the system is initiated at the beginning of the second succeeding negative half-cycle. Independently of the time of closure of starting button B, therefore, the operation of the system is initiated at the beginning of a succeeding negative half-cycle, which negative half-cycle may be the next succeeding half-cycle or may be the second succeeding negative half-cycle. Independently, also, of the time at which the push button B is opened to interrupt the operation of the system, the operation is terminated at the conclusion of a positive half-cycle, which positive half-cycle may be the same half-cycle during which button B is opened or may be the next succeeding positive half-cycle. Upon being started, therefore, the system supplies current to the work circuit W in increments of one or more full cycles of current flow, the number of such full cycles being directly controlled by the push button B.

It will be noticed that the successive energizations of the translating devices T2 and T3 bear a definite time relation to the variations in voltage of the supply circuit L1–L2, as determined by the characteristics of the control circuits immediately associated with translating devices T2 and T3. It will further be understood that this time phase relationship may be varied between relatively wide limits by suitably proportioning the characteristics of the control circuits, or by introducing usual phase shifting apparatus, for example, between the supply circuit L1–L2 and the transformer T5, the characteristic feature of the system being that the time interval between successive energizations of transformer T2 (or transformer T3) is equal to one full cycle of the supply circuit; and that each time the system is placed in operation as by closure of the button B, it remains in operation for one or more full cycles of the supply circuit depending upon the length of time the button B is held closed.

It will further be appreciated that valves V1 and V2 are fired or rendered conducting at substantially the instant that the igniter valves 58 and 68, respectively, are rendered conducting, and that, having been fired, the valves V1 or V2, as the case may be, remain conducting throughout the balance of the corresponding half cycle of current flow. Accordingly, by suitably predetermining the time of response of the igniter valves 58 and 68, respectively, to the transformers T2 and T3, the firing of valves V1 and V2 can be caused to bear a corresponding time relation to the initial energizations of transformers T2 and T3. This flexibility of the system makes it possible to readily compensate for differences in time phase relation between the flow of current in the work circuit W and the voltage of the supply circuit L1—L2. With welding loads, for example, which have a relatively poor power factor, the current in the work circuit W lags considerably behind the voltage in the supply circuit. With such loads, it is preferred, in the practice of the invention, to time the firing of valves V1 and V2, so that the flow of current in the work circuit W is initiated at the zero point of the current wave in such work circuit and so that the flow of current in the work circuit is interrupted at the zero point of such current wave. With such loads, therefore, it is desirable to delay the firing of valves V1 and V2 relative to the voltage of the circuit L1—L2 by an amount sufficient to compensate for the lag of the current in the work circuit W. In the present instance, this is accomplished by delaying the flow of current through the igniter valves 58 and 68 for a predetermined period following the energizations, respectively, of the transformers T2 and T3. As shown, the timing condensers C3 and C4 are interposed in the grid circuits of the valves 58 and 68. It will be understood that prior to the energization of transformer T11, transformer T8 is effective to build up a charge in the corresponding condenser C3. Also, when transformer T11 is energized, and balances out the voltage of transformer T8, condenser C3 is effective to maintain a blocking potential on the grid 56 for a time determined by the characteristics of condenser C3 and its associated resistor R3. At the expiration of the time delay period provided by condenser C3, however, the potential of grid 56 reaches a value at which valve 58 is conducting and valve 58 thereupon fires valve V1. Condenser C4 and its associated resistor R4 interpose a corresponding delay between the energization of transformer T12 and the firing of valve V2.

As previously mentioned, in the broader aspects of the invention, the push button B may be variously controlled so as to correspondingly determine the number of full cycles of the supply circuit throughout which the system is maintained in operation. A preferred arrangement for controlling this time interval automatically is disclosed in Fig. 2.

It will be understood that the complete system of Fig. 2 preferably duplicates the complete system of Fig. 1, with the exception that additional means comprising the valve 80 are provided to automatically terminate each timing interval. Fig. 2, therefore, shows only such parts of the system of Fig. 1 as are needed to clearly illustrate the relation of this automatic shut-off apparatus to the timing circuits.

Referring particularly to Fig. 2, push button B' controls the primary circuit of the transformer T5' as before, and the secondary winding 82 of transformer T5' is arranged as before to supply power through the valve 10' to charge up the condenser C1'. Condenser C1' in turn supplies power to the other elements of the timing circuit (not shown in Fig. 2) in the manner described with reference to Fig. 1. In this case, the valve 10' is provided with a usual control grid 84 and the arrangement is such as to maintain grid 84 at a non-blocking potential for a time interval following the closure of button B determined by the timing of the valve 80.

Valve 80 may be and preferably is a conventional three element electronic valve having a plate 86, a filament 88 and a control grid 90. The circuit of grid 90 includes the differentially connected secondary windings of transformers T13 and T14, and also includes a variable timing condenser C5 and a regulating resistor R5. The primary winding of transformer T14 is continuously energized from the supply conductors 4 and 6, which correspond to the conductors 4 and 6 of Fig. 1, and, so long as the button B' is open, transformer T14 maintains a blocking potential on the grid 90. The primary winding of transformer T13 is arranged to be connected to the supply circuit L1—L2 in response to closure of the button B', and so remains energized as long as button B' is closed. Thus, when button B' is closed to initiate an operation of the system, it not only energizes transformer T4' so as to start the system in operation in accordance with the description of Fig. 1, but it also energizes transformer T13. Transformer T13 neutralizes the effect of transformer T14 immediately upon closure of button B'. At this time, however, condenser C5 is charged, and is effective to maintain a blocking potential on the grid 90 for a time interval determined by the characteristics of condenser C5 and its associated timing resistor R5. At the expiration of this timing interval, the valve 80 becomes conducting, rendering the transformer T5' effective to energize the transformer T15. Upon being energized, the transformer T15 applies a blocking potential to the grid 84 of the valve 10', thereby interrupting the operation of the timing system in the same manner as was attributed to the opening of button B in the description of Fig. 1.

Upon being rendered conducting at the end of the timing period provided by condenser C5, valve 80 remains conducting, and so maintains a non-blocking potential on grid 84 so long as button B' is held closed. In order to restart the system, therefore, button B' must first be opened and then again be closed. The opening of button B' de-energizes transformer T4', which in turn de-energizes transformer T15, eliminating the blocking potential on grid 84. The opening of button B' also de-energizes transformer T13, enabling transformer T14 to recharge condenser C5. Even a momentary opening of button B', accordingly, reconditions the system for operation in response to reclosure of button B'.

It will be understood from the foregoing description that the present system provides an extremely simple and efficient arrangement for initiating and terminating the operation of controlled mechanism in definite time relation to a varying electrical characteristic of an associated circuit and for causing each such operation of the controlled mechanism to continue for an exact but readily controllable number of full cycles of the associated circuit. It will further be understood that various modifications in the form and arrangement of the present system may be made without departing from the spirit and scope of the present invention.

What I claim is:

1. In a system for effecting a control operation in timed relation to an electrical characteristic of an associated circuit which cyclically alternates between respectively opposite half-cycles, the combination of translating means actuable to cause said operation, a first timing means for actuating said translating means at one said half-cycle, and a second timing means for actuating said translating means at the opposite said half-cycle, one of said timing means being operably responsive to the other said timing means and being operably independent of the operation of said translating means.

2. In a system for effecting a control operation in timed relation to an electrical characteristic of an associated circuit which cyclically alternates between respectively opposite half-cycles, the combination of translating means actuable to cause said operation, a first timing means for actuating said translating means at one said half-cycle, and a second timing means for actuating said translating means at the opposite said half-cycle, said timing means being operably independent of the operation of said translating means but interrelated in such relation that each actuation of said translating means during one half-cycle is followed by an actuation thereof during the next half-cycle, and control means for starting said timing means and for determining the number of full cycles of said circuit that said timing means remains in operation.

3. In a system for effecting a control operation in timed relation to an electrical characteristic of an associated circuit which cyclically alternates between respectively opposite half-cycles, the combination of translating means actuable to cause said operation, a first timing means for actuating said translating means at one said half-cycle, and a second timing means for actuating said translating means at the opposite said half-cycle, said timing means being operably independent of the operation of said translating means but interrelated in such relation that each actuation of said translating means during one half-cycle is followed by an actuation thereof during the next half-cycle, switch means for placing said timing means in operation, and control means actuated when said timing means is placed in operation for determining the number of full cycles of said circuit that said timing means remains in operation.

4. In a system for effecting a control operation in timed relation to an electrical characteristic of an associated circuit which cyclically alternates between respectively opposite half-cycles, the combination of translating means actuable to cause said operation, a first timing means for actuating said translating means at one said half-cycle, a second timing means for actuating said translating means at the opposite said half-cycle, said timing means being operably independent of the operation of said translating means but interrelated in such relation that each actuation of said translating means during one half-cycle is followed by an actuation thereof during the next half-cycle, and switch means for initiating the operation of one of said timing means.

5. In a system for effecting a control operation in timed relation to an electrical characteristic of an associated circuit which cyclically alternates between half-cycles of respectively opposite polarity, the combination of translating means actuable to cause said operation, a first timing means including a first condenser and means to charge the same during each said half cycle of one polarity, means including a second condenser and means to connect the same to said first condenser to charge the second condenser during each said half-cycle of opposite polarity, and means rendering said condensers alternately effective to supply energy stored therein to and operate said translating means.

6. In a system for effecting a control operation in timed relation to an electrical characteristic of an associated circuit which cyclically alternates between half-cycles of respectively opposite polarity, the combination of translating means actuable to cause said operation, a first timing means including a first condenser and means to charge the same during each said half cycle of one polarity, means including a second condenser and means to charge the same during each said half-cycle of opposite polarity, and means rendering said condensers alternately effective to supply energy stored therein to and operate said translating means, said last mentioned means enabling each condenser to supply said energy during the period the other condenser is being charged.

7. In a system for effecting a control operation in timed relation to an electrical characteristic of an associated circuit which cyclically alternates between half-cycles of respectively opposite polarity, the combination of translating means actuable to cause said operation, a first timing means including a first condenser and means to charge the same during each said half cycle of one polarity, means including a second condenser, means operative at the beginning of each said half-cycle of opposite polarity to render said first condenser effective to supply energy to said translating means to actuate the same and to supply energy to the second condenser to charge the same, and means operative at the beginning of each said half-cycle of said one polarity to enable said second condenser to supply energy to said translating means.

8. In a system for effecting a control operation in timed relation to an electrical characteristic of an associated circuit which cyclically alternates between respectively opposite half-cycles, the combination of translating means actuable to cause said operation, a first timing means including a first condenser and means to charge the same during each said half cycle of one polarity, means including a second condenser and means to charge the same during each said half-cycle of opposite polarity, means rendering said condensers alternately effective to supply energy stored therein to and operate said translating means, and control means for initiating the operation of said system and for controlling the number of said half-cycles during which the system remains in operation.

9. In a system for effecting a control operation in timed relation to an electrical characteristic of an associated circuit which cyclically alternates between half-cycles of respectively opposite polarity, the combination of translating means actuable to cause said operation, a first timing means including a first condenser and means to charge the same during each said half-cycle of one polarity, means including a second condenser, means operative at the beginning of each said half-cycle of opposite polarity to render said first condenser effective to supply energy to said translating means to actuate the same and to supply energy to the second condenser to charge the same, means operative at the beginning of each said half-cycle of said one polarity to enable said second condenser to supply energy to said translating means, and control means for controlling the means for charging the first condenser so as to control the starting of the system and the number of full cycles the system remains in operation.

10. In a system for effecting a control operation in timed relation to an electrical characteristic of an associated circuit which cyclically alternates between half-cycles of respectively opposite polarity, a first timing means including a first condenser, charging means including an electric valve for connecting the first condenser to the said circuit during said half-cycles of one polarity so as to charge said first condenser during said last mentioned half-cycles, a first translating device, means including an electric valve operative to prevent a flow of current from said means to said translating device during said last mentioned half-cycles but operative to enable said condenser to supply current to said translating means during each half-cycle of opposite polarity, a second timing means including a second condenser, an electric valve and circuit connections associated therewith for enabling said first condenser to supply charging current to said second condenser during each said half-cycle of opposite polarity but preventing a reverse flow of energy, a second translating device, and means including an electric valve operative to prevent a flow of energy from said second condenser to said second translating means during each said half-cycle of opposite polarity but operative to enable said second condenser to supply current to said second translating device during each said half-cycle of said one polarity.

11. In a system for effecting a control operation in timed relation to an electrical characteristic of an associated circuit which cyclically alternates between half-cycles of respectively opposite polarity, a first timing means including a first condenser, charging means including an electric valve for connecting the first condenser to the said circuit during said half-cycles of one polarity so as to charge said first condenser during said last mentioned half-cycles, a first translating device, means including an electric valve operative to prevent a flow of current from said means to said translating device during said last-mentioned half-cycles but operative to enable said condenser to supply current to said translating means during each half cycle of opposite polarity, a second timing means including a second condenser, an electric valve and circuit connections associated therewith for enabling said first condenser to supply charging current to said second condenser during each said half cycle of opposite polarity but preventing a reverse flow of energy, a second translating device, means including an electric valve operative to prevent a flow of energy from said second condenser to said second translating means during each said half-cycle of opposite polarity but operative to enable said second condenser to supply current to said second translating device during each said half-cycle of said one polarity, and control means for controlling the connection of said first condenser to said supply circuit.

12. In a timing control system for association with an alternating current source, the combination of a condenser, means including an electric valve, having a control electrode, for connecting said condenser to said source during each half-cycle of one polarity and for disconnecting the condenser from the source during each half-cycle of opposite polarity, a translating device, means including an electric valve for disconnecting said condenser from said translating device during each said half-cycle of one polarity and for connecting said translating device to said condenser during each said half-cycle of opposite polarity, and control means operatively associated with said control electrode for controlling the conductivity of said first electric valve so as to control the starting and stopping of said system.

13. In a timing control system for controlling the connection between a work circuit and an alternating current supply circuit, the combination of an electric valve actuable to make said connection during each half cycle of one polarity, an electric valve operative to make said connection during each half cycle of opposite polarity, and timing control means for alternately actuating said valves in timed relation to alternations in said supply circuit, said timing means being operably interrelated but independent of current conditions in said work circuit in such relation that each actuation of one valve is followed in the next half-cycle by an actuation of the other valve.

14. In a timing control system for effecting control operations in timed relation to an electrical characteristic of an alternating current supply circuit, the combination of a first translating means disposed for actuation during half-cycles of the source of one polarity, a second translating means disposed for actuation during half-cycles of the source of opposite polarity, a first timing means for actuating said first translating means in a half-cycle of said one polarity, a second timing means for actuating said second translating means in a half-cycle of said opposite polarity, said timing means being operably independent of the operation of said translating means but interrelated in such relation that each actuation of said first translating means during a half-cycle of said one polarity is followed by an actuation of said second translating means during the next succeeding half-cycle of opposite polarity, and switch means for initiating the operation of one of said timing means.

15. In a timing control system for effecting control operations in timed relation to an electrical characteristic of an alternating current supply circuit, the combination of a first valve disposed to be rendered conductive during half-cycles of the source of one polarity, a second valve disposed to be rendered conductive during half-cycles of the source of opposite polarity, a first timing means for actuating said first valve in said half-cycles of one polarity, a second timing means for actuating said second valve in said half-cycles of opposite polarity, said timing means being operably independent of the operation of said valves but interrelated in such relation that each actuation of said one valve in a said half-cycle of one polarity is followed by an actuation of said second valve during the next succeeding half-cycle of opposite polarity, and switch means for initiating the operation of one of said timing means.

16. In a timing control system for effecting control operations in timed relation to an electrical characteristic of an alternating current supply circuit, the combination of a first translating means disposed for actuation during half-cycles of the source of one polarity, a second translating means disposed for actuation during half-cycles of the source of opposite polarity, a first timing means for actuating said first translating means in said half-cycles of one polarity, and a second timing means for actuating said second translating means in said half-cycles of opposite polarity, one of said timing means being operably responsive to the other timing means and being operably independent of the operation of said translating means.

17. In a timing control system for effecting control operations in timed relation to an electrical characteristic of an alternating current supply circuit, the combination of a first valve disposed to be rendered conductive during half-cycles of the source of one polarity, a second valve disposed to be rendered conductive during half-cycles of the source of opposite polarity, a first timing means for actuating said first valve in said half-cycles of one polarity, and a second timing means for actuating said second valve in saild half-cycles of opposite polarity, one of said timing means being operably responsive to the other said timing means and being operably independent of the operation of said valves.

18. In a timing control system for effecting control operations in timed relation to an electrical characteristic of an alternating current supply circuit, the combination of a first translating means disposed for actuation during half-cycles of the source of one polarity, a second translating means disposed for actuation during half-cycles of the source of opposite polarity, a first timing means for actuating said first translating means in said half-cycles of one polarity, a second timing means for actuating said second translating means in said half-cycles of opposite polarity, one of said timing means being operably responsive to the other timing means and being operably independent of the operation of said translating means, and switch means for initiating the operation of said other timing means.

19. In a timing control system for effecting control operations in timed relation to an electrical characteristic of an alternating current supply circuit, the combination of a first translating means disposed for actuation during half-cycles of the source of one polarity, a second translating means disposed for actuation during half-cycles of the source of opposite polarity, a first timing means for actuating said first translating means in said half-cycles of one polarity, a second timing means for actuating said second translating means in said half-cycles of opposite polarity, one of said timing means being operably responsive to the other timing means and being operably independent of the operation of said translating means, and control means including starting switch means operable to initiate the operation of said other timing means so as to cause said first and second translating means to be actuated in the corresponding half cycles of a predetermined plurality of full cycles of the source.

CLETUS J. COLLOM.